UNITED STATES PATENT OFFICE 2,537,968

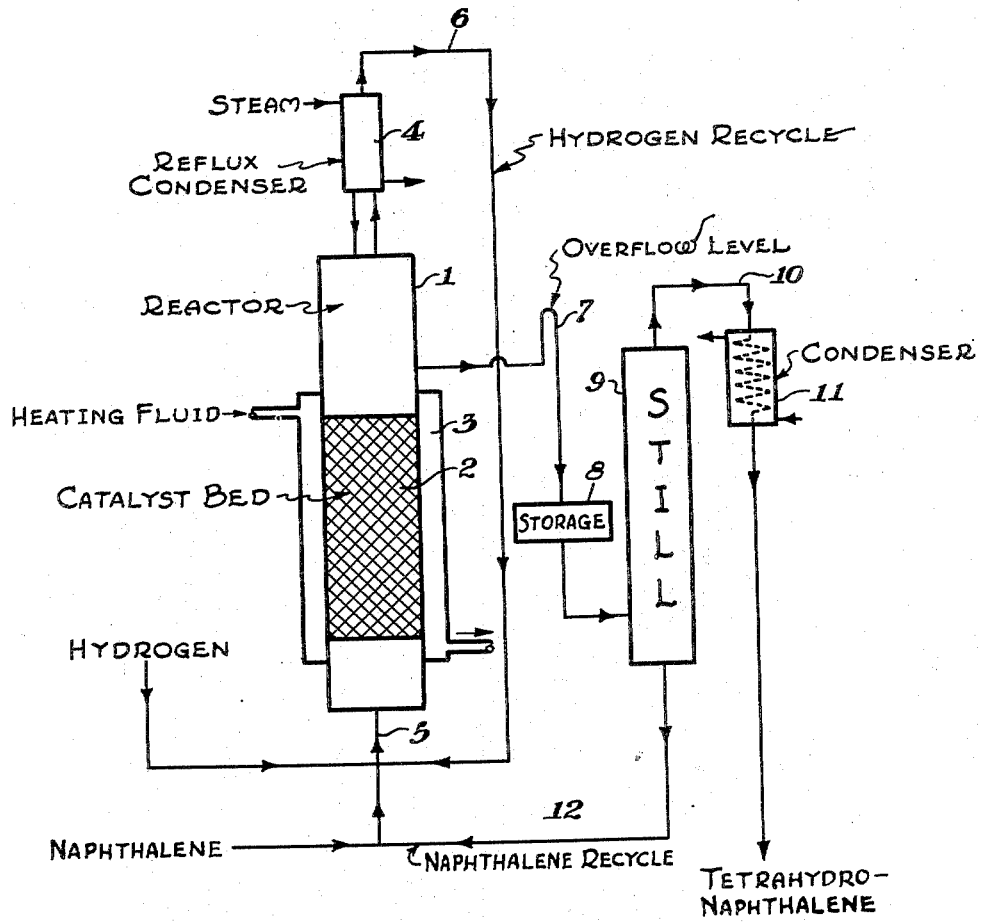

HYDROGENATION OF AROMATIC COMPOUNDS

William J. Cerveny, Hinsdale, Ill., assignor to Koppers Company, Inc., Pittsburgh, Pa., a corporation of Delaware Application January 18, 1947, Serial No. 722,819

16 Claims. (Cl. 260—667)

This invention relates to hydrogenation and is particularly directed to hydrogenation of naphthalene and other unsaturated compounds of the character set forth below.

In catalytic hydrogenation reactions it has been generally considered heretofore that a definite pressure of hydrogen above atmospheric is required to provide the driving force for the reaction. On account of this and notwithstanding certain scattered experiments reported in the literature of hydrogenations conducted at ordinary pressure, the art has not heretofore realized that it is practical to carry out certain hydrogenation reactions at atmospheric pressure. Possibly, the reason for this is that such atmospheric pressure hydrogenations as have been conducted in the prior art have been carried out in the vapor phase in which an adequate concentration of the prohydrogenate, that is to say, the material which is hydrogenated, is not obtained. Whatever the reason, the fact remains that atmospheric pressure hydrogenation of compounds such as naphthalene, phenol, cresol, indene and the like has achieved no practical significance in the art.

I have now found that certain unsaturated compounds may be effectively hydrogenated at atmospheric pressure by passing hydrogen through liquids containing them substantially at the atmospheric boiling points of such liquids in the presence of a hydrogenation catalyst provided the liquid has a boiling point within the effective hydrogenation temperature range of the catalyst. I have found that such reactions may be carried out simply and effectively under atmospheric pressure reflux whereby the heat of hydrogenation is dissipated in heat of vaporization of the liquid. In this manner I am able to obtain high conversions of hydrogenatable material to hydrogenate (the hydrogenated product) in an entirely unexpectedly short contact time. Consequently, by the processes of my invention it is possible to carry out hydrogenation reactions in relatively simple and inexpensive equipment without requiring elaborate heat exchange converters, pressure pumps, compressors and like equipment characteristic of the prior art processes.

The unsaturated compounds which may be processed according to the invention are those hydrogenatable unsaturated compounds having a boiling point at atmospheric pressure within the effective hydrogenation temperature range of the catalyst or those hydrogenatable compounds which in the presence of a suitable boiling point depressant will give a liquid reaction mass in which the hydrogenation may be effected having an atmospheric pressure boiling point within the effective hydrogenation temperature range of the catalyst. Typical compounds include unsaturated compounds such as naphthalene, phenol, indene and cresols. All these compounds have boiling points within the effective hydrogenation range of active hydrogenation catalysts such as reduced nickel. Raney nickel or like metallic nickel catalysts. Such materials, therefore, may be hydrogenated in accordance with the processes of the invention simply by boiling them under atmospheric pressure reflux in the presence of a suitably powdered or granulated metallic nickel catalyst while passing hydrogen through the boiling liquid.

It will be observed that in the above illustrative compounds there are unsaturated compounds of both ethenoid type and the benzenoid. Indene, for example, contains ethenoid unsaturation and might therefore be expected to be highly active in hydrogenation. It was so found in the processes of the invention. Naphthalene, on the other hand, in which the unsaturation is wholly of the benzenoid type might not be expected to be correspondingly active. It was surprising, therefore, to find that in the processes of the invention naphthalene could be effectively hydrogenated at relatively high liquid space velocity. Thus, while the invention is broadly applicable to unsaturated compounds containing both ethenoid and benzenoid unsaturation, it nevertheless has unexpected metal for hydrogenation of benzenoid compounds.

While my invention is particularly applicable to hydrogenations conducted with active catalysts such as metallic nickel catalysts, it is nevertheless in its broader aspects applicable to hydrogenations involving less active catalysts such as nickel sulphide and copper chromite. The threshold hydrogenation temperature varies with the activity of the catalyst and possibly to a lesser extent with the nature of the prohydrogenate. The effective hydrogenation temperature range for any particular catalyst likewise depends largely upon the catalyst and possibly to a lesser extent upon the nature of the prohydrogenate. It ranges from the lowest temperature at which hydrogenation will take place to that temperature at which dehydrogenation, cracking and other undesirable reactions become excessive. The principles which I have applied to the hydrogenation of naphthalene, phenol, indene, and cresol in the presence of a reduced nickel catalyst may also be applied to other compounds and other catalysts as long as the boiling point of the liquid which is or contains the prohydrogenate is within the effective hydrogenation temperature range of the catalyst.

In the accompanying flow sheet there is illustrated a typical process in accordance with the invention for effecting hydrogenation of naphthalene. The essential apparatus consists of a reactor 1, provided with means for supporting a catalyst bed 2, a suitable heating means 3 for heating the catalyst bed to the effective temperature and a steam heated reflux condenser 4. Hydrogen and naphthalene are introduced into the bottom of the reactor through line 5 and pass upwardly through the catalyst bed. Naphthalene and/or tetrahydronaphthalene are refluxed at atmospheric pressure in the reflux condenser 4 and excess hydrogen escapes through line 6 and is recycled through line 5. Hydrogenate is withdrawn from the top of reactor 1 through line 7 to storage 8 whence it is withdrawn as desired to still 9 from which tetrahydronaphthalene is taken overhead at 10 and condensed in condenser 11 and recovered as product. The naphthalene which remains in the still bottoms is recycled through line 12 to reactor 1.

The invention may be more fully understood by reference to the following example in which the parts are by weight unless otherwise specified:

*Example*

In apparatus of the character described in which the reactor is heated in a lead bath, sodium refined naphthalene (sulphur content 0.001%) and hydrogen were passed into the bottom of the reactor and upwardly through 500 cc. of catalyst (739.0 grams) arranged in a catalyst bed of 2 inches in diameter and 9 inches in length. The temperature of the lead bath was maintained between 200 and 215° C. and naphthalene and/or hydrogenated naphthalene refluxed in the condenser during the reaction. The rate of flow of naphthalene was adjusted to between 0.05 and 0.08 volume per unit volume of catalyst; that is to say, to a liquid hourly space velocity of 0.05 to 0.08 and the flow of hydrogen was regulated to 1.87–3.56 cubic feet per hour excess. The catalysate, naphthalene and tetrahydronaphthalene, overflowed from the reactor via the overflow line and excess hydrogen was vented via the reflux condenser. 1130 parts of naphthalene were processed to give 1032 parts of catalysate containing 37% of tetrahydronaphthalene and 63% of naphthalene.

The catalyst used in the process of the example was obtained by precipitating nickel carbonate on kieselguhr or diatomaceous earth, pelleting with the addition of about 4% graphite as lubricant and reducing in hydrogen at a temperature of about 427° C. The reduced catalyst contained 58% nickel.

The following table logs the operation over a period of thirty-six hours:

*Table I*

| Hrs. on Stream | T° C. (Lead Bath) | Naph. Charged | | Exit H$_2$, Cu. Ft. Hr. | Catalysate | |
|---|---|---|---|---|---|---|
| | | Percent of Total | L. S. V.[1] Hr. | | Percent Naph. | Percent Tetrahydronaphthalene |
| 2 | 203 | 6 | 0.07 | 2.27 | 24 | 76 |
| 4 | 205 | 11 | 0.06 | 1.91 | 37 | 63 |
| 8 | 207 | 22 | 0.06 | 1.91 | 59 | 41 |
| 12 | 200 | 33 | 0.07 | 1.87 | 65 | 35 |
| 16 | 200 | 40 | 0.07 | 1.94 | 68 | 32 |
| 20 | 200 | 54 | 0.08 | 3.54 | 66 | 34 |
| 24 | 200 | 67 | 0.08 | 1.99 | 70 | 30 |
| 28 | 208 | 79 | 0.07 | 1.93 | 70 | 30 |
| 32 | 212 | 90 | 0.06 | 1.93 | 74 | 26 |
| 36 | 215 | 100 | 0.05 | 1.97 | 77 | 23 |

[1] Liquid hourly space velocity.

The hydrogen flow should be adjusted to give an excess of hydrogen over that required for the hydrogenation. It is sufficient if the hydrogen flow is so regulated that hydrogen is vented through the reflux condenser. The amount of the excess is not critical but should be sufficient in the absence of other means of agitation to provide adequate stirring and agitation of the liquid reaction mass.

It is possible to vary the temperature of the reaction mass by including therein a suitable boiling point depressant. Tetrahydronaphthalene, for example, can be recycled to give a lower boiling point. Likewise, decahydronaphthalene, cyclohexanol, indan and like can be added and recycled if desired for this purpose.

While I have described my invention with reference to particular embodiment, it will be understood that variation may be made therein without departing from the spirit and scope of the invention as described above and as set forth in the appended claims.

I claim:

1. In a process for catalytic hydrogenation, the steps of continuously passing hydrogen upwardly through a liquid mass encompassing a bed of hydrogenation catalyst, said liquid mass comprising hydrogenatable material and having an atmospheric pressure boiling point within the effective hydrogenation temperature range of the catalyst, maintaining a continuous atmospheric pressure reflux over said liquid mass whereby the temperature of the liquid mass is maintained at its atmospheric pressure boiling point, continuously introducing make-up liquid to said liquid mass and continuously withdrawing liquid therefrom, said make-up liquor being added at a rate to maintain the liquid level of said liquid mass above the top of said catalyst bed, separating hydrogenate from the liquid withdrawn from above the catalyst bed and returning the remainder to said liquid mass.

2. The process of claim 1 in which the catalyst is a metallic nickel catalyst.

3. The process of claim 2 in which the hydrogenatable material is selected from the class consisting of naphthalene, indene, phenol and cresol.

4. The process of claim 2 in which the hydrogenatable material is naphthalene.

5. The process of claim 1 in which the liquid mass consists essentially of hydrogenatable material, hydrogenate and hydrogen.

6. The process of claim 5 in which the catalyst is a metallic nickel catalyst.

7. The process of claim 6 in which the hydrogenatable material is selected from the class consisting of naphthalene, indene, phenol and cresol.

8. The process of claim 6 in which the hydrogenatable material is naphthalene.

9. In a process for catalytic hydrogenation, the steps of continuously passing hydrogen upwardly through a liquid mass encompassing a bed of hydrogenation catalyst, said liquid mass comprising hydrogenatable material and having an atmospheric pressure boiling point within the effective hydrogenation temperature range of the catalyst; continuously introducing make-up liquid to said liquid mass and continuously withdrawing liquid therefrom, said make-up liquor being added at a rate to maintain the liquid level of said liquid mass above the top of said catalyst bed, separating hydrogenate from the liquid withdrawn from above the catalyst bed and returning the remainder to said liquid mass; maintaining the pressure over said liquid mass substantially at atmospheric pressure whereby heat of catalysis causes the liquid mass above said catalyst bed to boil thereby transforming heat of catalysis into heat of vaporization.

10. The process of claim 9 in which the catalyst is a metallic nickel catalyst.

11. The process of claim 10 in which the hydrogenatable material is selected from the class consisting of naphthalene, indene, phenol and cresol.

12. The process of claim 10 in which hydrogenatable material is naphthalene.

13. The process of claim 9 in which the liquid mass consists essentially of hydrogenatable material, hydrogenate and hydrogen.

14. The process of claim 13 in which a catalyst is the metallic nickel catalyst.

15. The process of claim 14 in which the hydrogenatable material is selected from the class consisting of naphthalene, indene, phenol and cresol.

16. The process of claim 14 in which hydrogenatable material is naphthalene.

WILLIAM J. CERVENY.

REFERENCES CITED

The following references are of record in the file of this patent:

UNITED STATES PATENTS

| Number | Name | Date |
| --- | --- | --- |
| 1,345,589 | Ellis | July 6, 1920 |
| 2,303,118 | Frey | Nov. 24, 1942 |
| 2,426,929 | Greensfelder | Sept. 2, 1947 |

Certificate of Correction

Patent No. 2,537,968

January 16, 1951

WILLIAM J. CERVENY

It is hereby certified that error appears in the printed specification of the above numbered patent requiring correction as follows:

Column 2, line 5, for "nickel. Raney" read *nickel, Raney*; line 29, for the word "metal" read *merit*;

and that the said Letters Patent should be read as corrected above, so that the same may conform to the record of the case in the Patent Office.

Signed and sealed this 27th day of March, A. D. 1951.

[SEAL]

THOMAS F. MURPHY,
*Assistant Commissioner of Patents.*